United States Patent Office 3,460,407
Patented Aug. 12, 1969

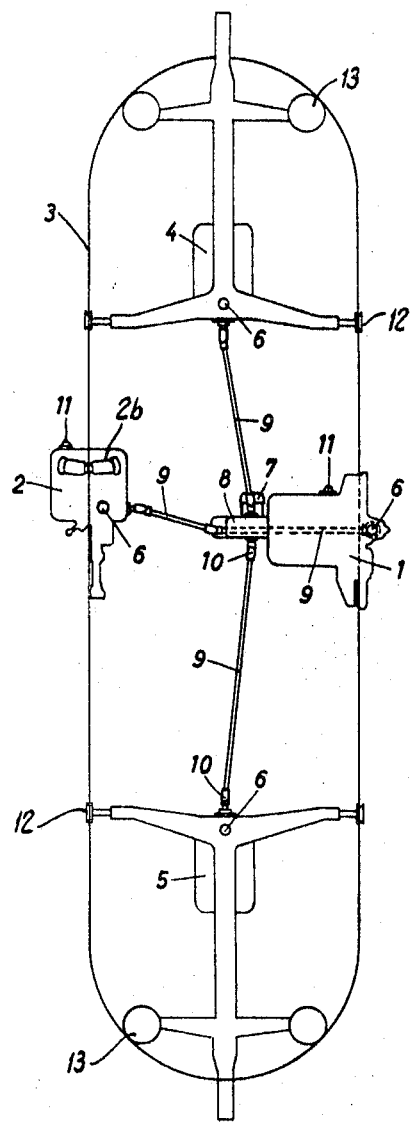
INVENTOR.
UDO VOLLMER
BY
nolte & nolte
ATTORNEYS

3,460,407
BAND SAW SHARPENING DEVICE
Udo Vollmer, Biberach an der Riss, Germany, assignor to Vollmer Werke Maschinenfabrik G.m.b.H., Biberach an der Riss, Germany
Filed Apr. 19, 1966, Ser. No. 543,714
Claims priority, application Germany, Apr. 22, 1965, V 17,513
Int. Cl. B23d 63/08
U.S. Cl. 76—37          5 Claims

ABSTRACT OF THE DISCLOSURE

Several separate band saw processing and guide units are arranged on a common base plane. Each unit comprises band-saw guide elements and a lifting spindle for adjusting the height of these guide elements above the base plate according to different widths of the saw. The position of the spindles is controlled simultaneously by a common reversible electromotor which is operatively connected to the spindles by means of a number of radially arranged universal-joint shafts driven by the motor.

---

This invention relates to a band saw sharpening device and more particularly to a mechanism for adjusting the height of the guide means for the band saw loop, in order to sharpen band saws of different widths.

In known band saw sharpening devices, the respective band saw processing and guide units are spaced apart one from another and are mounted on a common base plane supporting the band saw to be sharpened at a certain height above the base plane. When band saws of different widths are to be sharpened, the height of the guide means must be adjusted accordingly. For this purpose elevating spindles are provided in machines of this type which have to be manually adjusted. Consequently, in known machines it is always relatively complicated and time consuming to adjust the machine parts for sharpening band saws of different widths.

It is therefore an object of this invention to overcome the above-mentioned disadvantages by providing a centrally arranged adjusting device for simultaneously adjusting the heights of all of the guide means of the device.

According to the present invention a single drive means, which is preferably an electrical motor, is operatively connected to a plurality of spindles which elevate or lower the supporting guide elements of the sharpening unit and the feeding unit as well as the guide elements of the additional band saw supporting blocks of said device.

By providing an electric switch for the drive motor at each band saw processing unit of the device, the operator may adjust the height of the elements from a single operating station.

In this way the operation of the sharpening devices for band saws is substantially simplified, and time consuming adjusting operations are eliminated.

For a better understanding of the invention, its operating advantages, and the specific objects attained by its use, reference should be had to the following description and to the accompanying drawing.

The single figure of the drawing is a schematic plan view of a device for sharpening band saws, constructed and arranged according to the invention.

In the drawing, there are shown two separate band saw processing units of the device, namely a sharpening unit 1 and a feeding or straightening unit 2. Each of the two processing units 1 and 2 includes guide elements (not shown) for supporting the band saw loop 3 at a certain height above the base plane.

The feeding group 2 includes a pair of transport rollers 2b which may be spring-urged against opposite faces of the band saw.

Additional band saw supporting units or blocks 4 and 5 are positioned within the area of the band saw loop 3 between the sharpening unit 1 and the feeding unit 2. Each supporting block carries a pair of transversely spaced vertical saw support guide rollers 12, which support the band saw at a definite height above the base plane. Each supporting block also carries a pair of transversely spaced horizontal saw supporting guide rollers 13, which suitably span the band saw loop 3.

For adjusting the height of guide elements of the band saw processing and supporting units with respect to the base plane, lifting spindles 6 are associated with respective sharpening unit 1, feeding unit 2 and with each of the supporting blocks 4 and 5.

In accordance with the present invention, all of the lifting spindles 6 are simultaneously driven by a common drive system, which in the shown embodiment is schematically represented by a reversible electric motor 7. The output shaft of motor 7 is operatively connected to a gear mechanism 8. A plurality of radially arranged drive shafts 9 in turn are operatively connected at one end by means of a number of universal joints 10, to gear mechanism 8 and are operatively connected at their other end to a plurality of individual lifting spindles 6 by means of a second plurality of universal joints 10. The lifting spindles 6 are of a conventional design and by being rotated they simultaneously elevate or lower the associated guide elements of individual saw processing and saw supporting units with respect to the base plane. Thus when shafts 9 are rotated by the operation of motor 7 acting through gear mechanism 8 and the first set of universal joints 10, the rotation about a horizontal axis of shafts 9 is converted to a rotation of spindles 6 about a vertical axis, due to the operation of the second set of universal joints 10. This rotation of spindles 6 cause the desired vertical movement of the units 1, 2, 4 and 5. Universal joints 10 connect the ends of the drive shafts 9 to the common gearing 8 and to the spindles 6, which arrangement makes it possible to adjust the levels of the individual units 1, 2, 4 and 5 of the device with respect to the base plane.

The electric motor 7 is controlled for advance or reverse rotation by a switch 11 which may be positioned conveniently for the operator of the device. As shown in the drawing, two controlling switches 11 are provided: one at the sharpening unit 1 and the other at the feeding unit 2. The operator can thus control the height adjusting mechanism from each of said units. Moreover limit switches (not shown) may be employed to restrict the extent of height adjustment.

While the above description discloses a preferred embodiment of the invention, my invention is by no means limited to the embodiments described and shown, but rather is to be limited only by the scope of the appended claims.

What is claimed is:
1. A device for sharpening band saws, comprising: band saw processing means; a plurality of separate, independent, and individually supported guide means associated with said processing means for supporting a band saw, at separate locations along its length, in a common plane above a base plane; a plurality of height adjusting elements associated with respective ones of said guide means; a central drive means; and a plurality of coupling means respectively connected between said central drive means and said height adjusting elements for adjusting the height of said plurality of separate, independent, and individually supported guide means above said base plane simultaneously.

2. The device as claimed in claim 1, wherein said central drive means is a reversible electric motor, and said coupling means comprise a plurality of drive shafts driven by said motor, and a plurality of universal-joints operatively connected to said shafts and to said height adjusting elements.

3. The device according to claim 2 wherein said height adjusting element comprise a lifting spindle.

4. The device according to claim 2 further comprising switch means located at said band saw processing means for controlling the direction of rotation of said motor.

5. The device according to claim 2 further comprising an intermediate gearing disposed between said motor and said shafts.

References Cited

UNITED STATES PATENTS 434,011    8/1890    Wrigley.
2,366,888    1/1945    Werden et al. _____ 53—75

FOREIGN PATENTS 291,770    12/1931    Italy.
549,112    11/1922    France.

TRAVIS S. McGEHEE, Primary Examiner